Jan. 11, 1955   E. L. WAGNER   2,699,009
ARTIFICIAL FISHING FLY
Filed Sept. 12, 1951
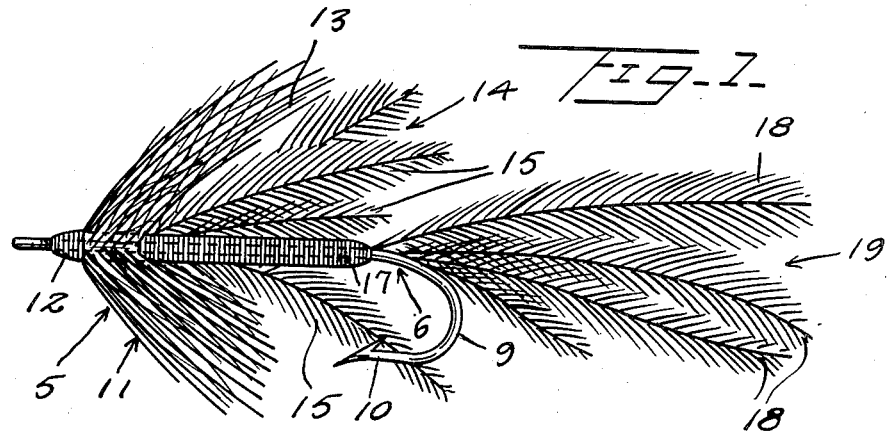
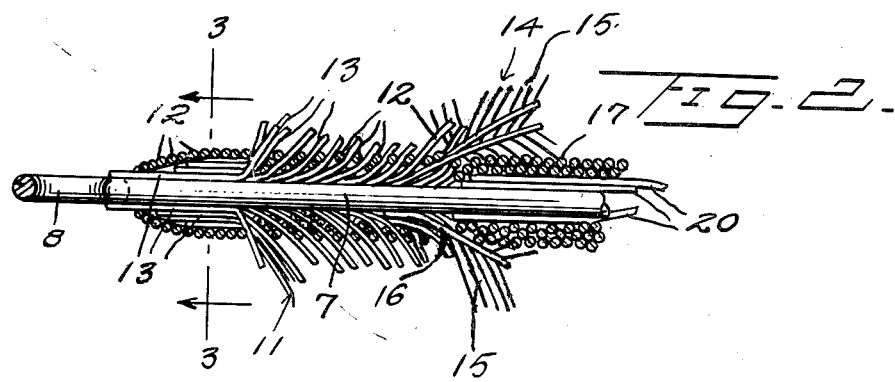
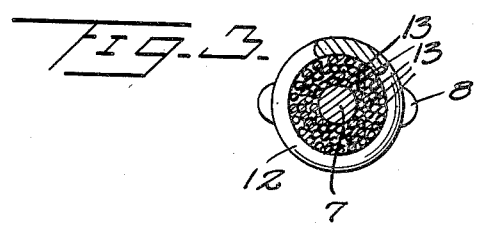
Inventor
*Ervin L. Wagner*
By *John N. Randolph*
Attorney

United States Patent Office 2,699,009
Patented Jan. 11, 1955

2,699,009

ARTIFICIAL FISHING FLY

Ervin L. Wagner, Louisville, Ky.

Application September 12, 1951, Serial No. 246,225

1 Claim. (Cl. 43—42.25)

This invention relates to a novel construction of fishing fly and more particularly to a "wet" type streamer fly and has for its primary object to provide an artificial lure which is so constructed that the tail or trailing streamers thereof cannot become fouled in the bend of the hook, as frequently occurs with conventional flies, which prevents such flies from assuming a natural position in the water and thus destroys their attractiveness for game fish.

Still another object of the invention is to provide a "wet" type streamer fly having hackle and short front streamers in addition to long trailing streamers for rendering the lure body "bushy" to give the lure the illusion of bulk when in the water, and wherein the hackle and front and rear streamers are so mounted that none of said parts will become fouled on the bend of the hook of the lure.

Still a further object of the invention is to provide a streamer type fly wherein the wagging motion of the long trailing streamers of the fly will not be impeded by the hook as the fly is moved in the water.

Various other objects and advantages of the invention will hereinafter become more fully apparent from the following description of the drawing, illustrating a presently preferred embodiment thereof, and wherein:

Figure 1 is a side elevational view of the artificial fishing fly;

Figure 2 is an enlarged fragmentary longitudinal sectional view, partly in side elevation of the forward portion of the fishing fly, and Figure 3 is an enlarged cross sectional view through the forward part of the fishing fly taken substantially along a plane as indicated by the line 3—3 of Figure 2.

Referring more specifically to the drawing, the artificial fishing fly in its entirety and as illustrated in Figure 1, is designated generally 5 and includes a conventional fishhook 6 of the type employed with artificial fishing lures. The fishhook 6 includes an elongated substantially straight shank 7 having an eye 8 at its forward end. The fishhook 6 also includes the usual turned back bent portion 9 constituting an extension of the opposite, rear end of the shank 7 and which terminates in a substantially straight forwardly extending barbed bill portion 10.

The lure or fly 5 includes a hackle 11 secured to the hook shank 7 rearwardly of and adjacent the eye 8 by a wrapping 12. The hackle 11 comprises a multiplicity of hair-like strands 13, illustrated greatly enlarged in Figure 2. The corresponding ends of the hackle strands 13 are anchored or clamped against the hook shank 7 and longitudinally thereof by the wrapping 12, said strands 13 extending rearwardly from their forward, anchored ends and outwardly between spaced convolutions of the rear part of the wrapping 12, as illustrated in Figure 2. As seen in Figure 1, the entire hackle 11 projects from the wrapping 12 relatively near to the forward end of the shank 7.

A short front streamer, designated generally 14, includes a plurality of feathers 15, the quills of which, as seen at 16 in Figure 2, are anchored against the shank 7 and longitudinally thereof by the rear convolutions of the wrapping 12. The feathers project in rearwardly diverging relationship from the hook shank 7 from the rear end of the wrapping 12 and are relatively short so that the feathers 15 forming the front streamer 14 terminate adjacent to or forwardly of the trailing end of the hook 6.

The hook shank 7 is provided with a second relatively long wrapping 17 which extends from the rear end of the wrapping 12 to adjacent the rear end of the hook shank 7. The forward end of the wrapping 17 engages the feathers 15 of the front streamer 14 to cause said feathers to diverge rearwardly with respect to the hook shank 7, as illustrated in Figures 1 and 2. A plurality of longer feathers 18, forming a rear or trailing streamer 19 have quills 20 which are disposed longitudinally of the shank 7 and which are anchored between said shank and the wrapping 17. The feathers 18 extend rearwardly from the rear end of the wrapping 17 a substantial distance rearwardly of the trailing, bent portion 9 of the hook 6 and since the individual feathers 18 are anchored to the hook 6 close to its bend 9, it will be readily apparent that the feathers forming the trailing streamer 19 may not become engaged in the bend 9 of the hook and which would cause the feathers 18 to project from the hook, substantially transverse to the longitudinal axis of the hook, which frequently occurs where a lure is provided with a long trailing streamer which is anchored to the hook adjacent its forward end. Likewise, the shorter feathers 15 of the front streamer 14 are of insufficient length to become fouled in the bend 9 of the hook and even if the trailing, free end of one of the front feathers 15 contacts the barbed end 10 or bend 9 said portion is sufficiently flexible so that it cannot be held thereby in a transversely extending position with respect to the longitudinal axis of the hook 6. Thus, the lure 5 is so constructed that the streamers thereof will always be disposed in a normal position as illustrated in Figure 1 while the lure is moving through the water so that the lure will efficiently function to attract game fish, whereas if the trailing streamer 19 were anchored at the forward or adjacent the forward end of the hook shank 7 the feathers thereof could be fouled in the bend 9 so as to be disposed in a transversely extending position from the hook and which constitutes an unnatural appearing position to the game fish and rendering the lure substantially useless in attracting fish while the feathers are thus disposed. Furthermore, such a result frequently occurs in casting a lure where the streamers are anchored near the leading end of the hook shank and the fisherman has no way of determining if this has occurred until the lure is again removed from the water.

The location of the front streamer 14 between the front wrapping 12 and rear wrapping 17 causes this streamer to be mounted with the feathers 15 yieldably urged away from the wrapping 17 so that the feathers 15 will tend to open and close as the lure is moved through the water, thereby causing the fly to very realistically simulate the breathing and pulsating action of a live minnow.

The hackle 11, front streamer 14 and trailing streamer 19 may be made in various colors and in contrasting colors, as desired, for attracting different species of game fish and the wrappings 12 and 17 may likewise be made in various colors for more realistically simulating, in combination with the colored hackle and streamers, different natural bait of various game fish. Likewise, the lure 5 may be made in various sizes for attracting game fish of different species and sizes and for use either as a fresh water or salt water artificial lure.

Various other modifications and changes are likewise contemplated and may obviously be resorted to, without departing from the spirit or scope of the invention as hereinafter defined by the appended claim.

I claim as my invention:

An artificial fishing fly, comprising in combination with a fishhook including an elongated shank having a forward end and a rear end, a forwardly extending hook bill offset from the rear end of said shank and a bent hook portion connecting the rear end of the shank and the hook bill; a front wrapping wound about the forward end of said hook shank, a hackle comprising a multiplicity of hair-like strands having corresponding forward ends anchored against the hook shank beneath said front wrapping, said hackle strands extending outwardly and rearwardly from between longitudinally spaced rear convolutions of the front wrapping, a rear wrapping wound on the hook shank and extending from adjacent the rear end of said front wrapping to adjacent the rear end of the hook shank, a trailing streamer comprising a plurality of feathers having quills disposed against the hook shank beneath the rear wrapping and anchored thereto by the rear wrapping, said feathers projecting from the rear end of the rear wrapping and extending rearwardly a substantial distance beyond the trailing end portion of the fishhook as defined by said bent portion and being anchored to the fishhook adjacent its trailing end and near said bent portion, and a front streamer comprising a plurality of feathers having quills anchored to the forward end of the hook shank beneath the front wrapping and longitudinally thereof and extending outwardly and rearwardly from the hook shank between the front and rear wrappings, portions of said front streamer, disposed adjacent the front wrapping, bearing against the forward end of the rear wrapping and being flexed thereby away from the rear wrapping and the rear portion of the hook shank so that a free end of the front streamer is disposed in rearwardly diverging relation to the hook shank, said front streamer being urged toward and away from the rear wrapping by variations in water pressure as the fly is moved through the water to simulate the breathing and pulsating actions of a bait fish, and said hackle being disposed forwardly of the front streamer in contact therewith and being held thereby in rearwardly diverging relation to the wrappings to combine with the front streamer to produce a bushy appearance and to cause the hackle to move toward and away from the hook shank with the front streamer.

References Cited in the file of this patent

UNITED STATES PATENTS

| Number | Name | Date |
|---|---|---|
| 1,212,752 | Fiebig | Jan. 16, 1917 |
| 1,591,704 | Grube | July 6, 1926 |
| 1,592,600 | Hickman | July 13, 1926 |
| 1,657,734 | Wright et al. | Jan. 31, 1928 |
| 1,734,346 | Reinhardt | Nov. 5, 1929 |
| 1,929,151 | Peckinpaugh | Oct. 3, 1933 |
| 2,034,832 | Raycraft | Mar. 24, 1936 |
| 2,082,305 | Strong | June 1, 1937 |
| 2,292,592 | Wright | Aug. 11, 1942 |
| 2,306,005 | Thomas | Dec. 22, 1942 |
| 2,586,719 | Ross | Feb. 19, 1952 |

OTHER REFERENCES

How to Tie Flies, page 18, plate 6, Fig. 15; and specification pages 19 and 20. (Copyright 1935 by E. C. Gregg.)